United States Patent
Shaffer et al.

(10) Patent No.: US 12,402,559 B2
(45) Date of Patent: *Sep. 2, 2025

(54) WALK OUTDOOR POWER EQUIPMENT UNIT HAVING HANDLE MOUNTED OPERATIONAL CONTROLS USING COMPLIANT MECHANISMS

(71) Applicant: THE TORO COMPANY, Bloomington, MN (US)

(72) Inventors: Chadwick A. Shaffer, Oakdale, MN (US); Chris A. Wadzinski, Inver Grove Heights, MN (US); Jeff Weber, Minneapolis, MN (US); Shawn S. Monitor, Robbinsdale, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,233

(22) Filed: Jul. 1, 2024

(65) Prior Publication Data

US 2024/0349641 A1 Oct. 24, 2024

Related U.S. Application Data

(63) Continuation of application No. 17/488,643, filed on Sep. 29, 2021, now Pat. No. 12,069,984.

(51) Int. Cl.
| | | |
|---|---|---|
| *A01D 34/69* | (2006.01) | |
| *A01D 34/68* | (2006.01) | |
| A01D 101/00 | (2006.01) | |

(52) U.S. Cl.
CPC ......... *A01D 34/69* (2013.01); *A01D 34/6806* (2013.01); *A01D 2034/6843* (2013.01); *A01D 2101/00* (2013.01)

(58) Field of Classification Search
CPC ............... A01D 34/69; A01D 34/6806; A01D 2034/6843

See application file for complete search history.

(56) References Cited

U.S. PATENT DOCUMENTS

| 4,503,958 A | 3/1985 | Nishio |
| 4,667,459 A | 5/1987 | Scanland |

(Continued)

FOREIGN PATENT DOCUMENTS

| EP | 2805597 A1 | 11/2014 |
| EP | 3329763 A1 | 6/2018 |

(Continued)

OTHER PUBLICATIONS

International Preliminary Report on Patentability in PCT/US2022/043629, dated Jul. 12, 2023, 21 pages.

(Continued)

*Primary Examiner* — Abigail A Risic
(74) *Attorney, Agent, or Firm* — Mueting Raasch Group

(57) ABSTRACT

An outdoor power equipment unit, such as a lawn mower, includes a frame movable over the ground. A handle assembly is provided on the frame to allow an operator to walk on the ground behind the handle assembly while operating the unit. A traction drive and a ground grooming or working implement are carried on the frame. A traction control hand grip and an implement control bail are carried on the handle assembly. Both the hand grip and the bail are movable relative to the handle assembly by flexure provided by first and send compliant mechanisms.

15 Claims, 9 Drawing Sheets

(56) References Cited

U.S. PATENT DOCUMENTS

| | | |
|---|---|---|
| 6,945,133 B2 | 9/2005 | Rush et al. |
| 7,762,049 B2 | 7/2010 | Eaton |
| 7,762,050 B1 | 7/2010 | Kaskawitz |
| 2010/0025124 A1 | 2/2010 | Arpino |
| 2010/0307908 A1 | 12/2010 | Selzer |
| 2013/0046448 A1 | 2/2013 | Fan et al. |
| 2016/0037719 A1 | 2/2016 | Bian |
| 2017/0367259 A1 | 12/2017 | Shaffer |
| 2021/0185912 A1 | 6/2021 | Wilks |
| 2023/0098509 A1 | 3/2023 | Shaffer |

FOREIGN PATENT DOCUMENTS

| | | |
|---|---|---|
| EP | 3471126 A1 | 4/2019 |
| EP | 3666055 A1 | 6/2020 |

OTHER PUBLICATIONS

International Search Report and Written Opinion in PCT/US2022/043629, dated Dec. 14, 2022, 12 pages.

Written Opinion of the International Preliminary Examining Authority in PCT/US2022/043629, dated Aug. 8, 2023, 9 pages.

Operator's Manual, "Self Propelled Mower, Rear Wheel Drive Model Series Q and R," Form No. 769-18650A, Troy-Bilt LLC, Valley City, OH, USA, dated 2019 [retrieved Apr. 18, 2024]. Retrieved from the Internet: <URL: https://www.troybilt.com/en_US/self-propelled-mowers/tbwc23b-xp-self-propelled-lawn-mower/12ABR27B766.html>, 28 pages.

Parts Diagram, "Troy-Bilt Model TBWC23 XP (2021) > Control Bails." Troy-Bilt LLC, Valley City, OH, USA, [retrieved Apr. 18, 2024]. Retrieved from the Internet: <URL: https://www.troybilt.com/en_US/ari-partstream-host.html>, 2 pages.

European Examination Report issued Apr. 25, 2025, for European Patent Application No. 22787051.6, 8 pages.

WALK OUTDOOR POWER EQUIPMENT UNIT HAVING HANDLE MOUNTED OPERATIONAL CONTROLS USING COMPLIANT MECHANISMS

This application is a continuation application of U.S. patent application Ser. No. 17/488,643, filed Sep. 29, 2021, the disclosure of which is incorporated herein by reference.

TECHNICAL FIELD

This invention relates to a walk outdoor power equipment unit, such as a walk power lawn mower, having various powered components which are controlled by an operator using operational controls mounted on a handle of the unit.

BACKGROUND OF THE INVENTION

Walk power mowers of the type commonly used by homeowners to cut the grass in their yards are well known. Such mowers have a frame that carries various wheels for allowing movement of the frame over the ground. The frame is shaped to provide a cutting deck having a downwardly facing cutting chamber that houses one or more rotary blades for cutting grass. The frame may have a traction drive to self-propel the frame over the ground.

A power source, such as an internal combustion engine or an electric motor powered by an onboard battery pack, is mounted on the frame atop the cutting deck. The power source is suitably coupled to whatever cutting blades are enclosed in the cutting chamber to rotate such cutting blades in horizontal cutting planes. The power source is also suitably coupled to the traction drive to rotate or power at least some of the wheels carried on the frame. The traction drive relieves the operator of having to manually propel the frame over the ground.

The frame of the mower includes an upwardly and rearwardly extending handle to allow the operator to guide the frame during a grass cutting operation and to manually propel the frame in a mower which lacks a traction drive. Various hand operated operational controls are typically located on the upper end of the handle. Such controls allow the operator to engage and disengage the rotation of the blades and/or to engage and disengage the operation of the traction drive. When the traction drive is capable of propelling the mower at a variable ground speed, such controls will also allow the operator to set or maintain the ground speed desired by the operator.

The operational controls are often mounted on the handle for pivoting about lateral, substantially horizontal pivot axes. This requires the use of various pivots, bushings and fasteners for securing the controls to the handle while providing smooth and reliable pivoting of the controls on the handle. In addition, various springs are often required as well to normally dispose the controls in a disengaged condition or in a neutral position when the controls are bi-directionally movable. While the use of such mechanical components is effective for the purpose of mounting the controls on the handle and for providing the motion required of the controls, such components add complexity and cost to the mower.

SUMMARY OF THE INVENTION

One aspect of this invention relates to a walk outdoor power equipment unit for performing a ground grooming or working operation. The unit comprises a frame which is movable over the ground. A prime mover is carried by the frame. A traction drive is carried by the frame and is operatively powered by the prime mover for self-propelling the frame over the ground at a variable speed. An implement is carried by the frame and is operatively powered by the prime mover for performing the ground grooming or working operation. A handle assembly is carried by on the frame and is configured for use by an operator who walks on the ground. At least one control is carried by the handle assembly for controlling at least one of the traction drive or the implement. The at least one control acts through a compliant mechanism to effect control of the at least one of the traction drive or implement.

One aspect of this invention relates to a walk outdoor power equipment unit for performing a ground grooming or working operation. The unit comprises a frame which is movable over the ground. A prime mover is carried by the frame. A traction drive is carried by the frame and is operatively powered by the prime mover for self-propelling the frame over the ground at a variable speed. An implement is carried by the frame and is operatively powered by the prime mover for performing the ground grooming or working operation. A handle assembly is carried by on the frame and is configured for use by an operator who walks on the ground. At least one control is carried by the handle assembly for controlling at least one of the traction drive or the implement. The at least one control is movably mounted on the handle assembly by a compliant mechanism.

Another aspect of this invention relates to an outdoor power equipment unit. The unit comprises a frame movable over the ground. A handle assembly is provided on the frame to allow an operator to walk on the ground behind the handle assembly while operating the unit. A traction drive and a ground grooming or working implement are carried on the frame. A traction control hand grip and an implement control bail are carried on the handle assembly. The hand grip and the bail are movable relative to the handle assembly by flexure provided by a pair of compliant mechanisms, respectively.

BRIEF DESCRIPTION OF THE DRAWINGS

This invention will be described in detail hereafter in the Detailed Description, when taken in conjunction with the following drawings, in which like reference numerals refer to like elements throughout.

DETAILED DESCRIPTION

Figure 1:
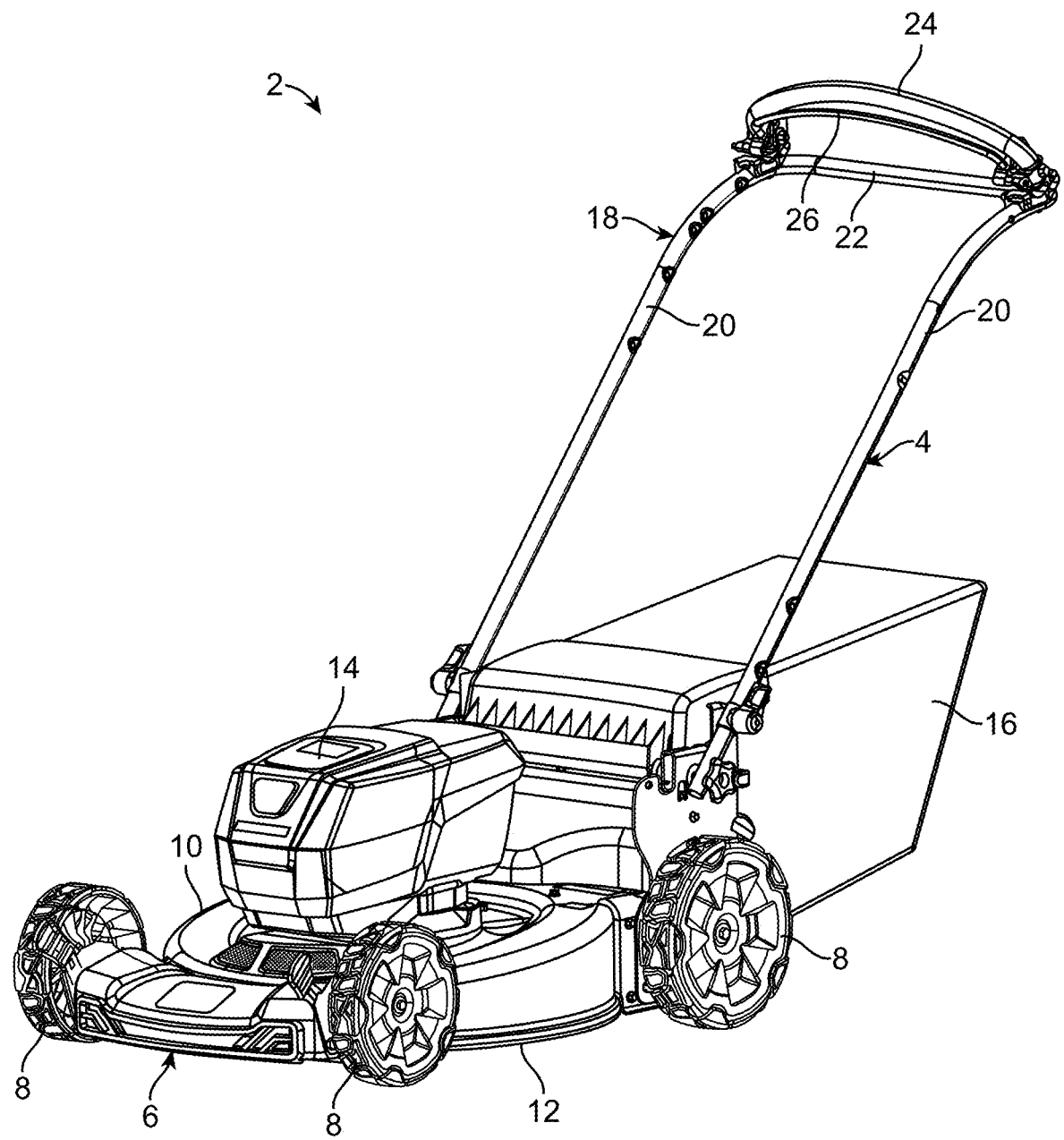
FIG. 1 is a perspective view of one example, i.e., a walk power mower, of a walk outdoor power equipment unit equipped with the operational controls of a first embodiment of this invention mounted to an upper portion of a handle of the unit.

One example of a walk outdoor power equipment unit 2 having the operational controls of this invention is illustrated in FIG. 1. In this example, walk outdoor power equipment unit 2 comprises a walk power mower 4 of the type homeowners commonly use to cut the grass in their lawns. However, the operational controls of this invention are not limited for use on a mower 4, but could be used on other walk outdoor power equipment units 2 having a powered implement for performing a ground grooming or working operation and/or a traction drive for self-propelling unit 2. These units 2 could comprise a snowblower, an aerator, a trencher, a stump grinder, a blower, and the like.

Referring further to mower 4 of FIG. 1 by way of example, mower 4 has a frame 6 supported for movement over the ground by a plurality of wheels 8. A central portion of frame 6 forms a generally circular cutting deck 10 which provides a downwardly facing cutting chamber 12 that is open at the bottom. A prime mover 14, e.g. an internal combustion engine, an electric motor powered by an onboard battery pack, or the like, is mounted atop cutting deck 10. A vertical drive shaft (not shown) of prime mover 14 extends downwardly into cutting chamber 12.

In mower 4 of FIG. 1, at least one grass cutting blade (not shown) is coupled in any suitable manner to the drive shaft of prime mover 14. The blade comprises or the blades collectively comprise the powered implement for performing a ground grooming or working operation. In this case, that operation is cutting grass. The results of that operation, namely the grass clippings generated by the operation of the blade(s), are thrown into a rearwardly disposed bag 16 in a collecting mode of operation or may be driven downwardly into the cut swath in a mulching mode of operation if bag 16 is not installed on mower 4 or mower 4 was not built to accommodate bag 16.

In one embodiment of this invention, mower 4 has a traction drive (not shown) for self-propelling frame 6 of mower 4 over the ground at least in a forward direction at a variable ground speed. In other embodiments, the traction drive could be configured to self-propel frame 6 in both forward and reverse directions at variable ground speeds in each direction. The variable ground speeds could be infinitely variable, e.g. by infinitely changing the speed of an electric motor driving an axle that mounts rear wheels 8 or by shifting a continuously variable transmission driving the axle. Alternatively, the variable ground speeds could be changed in discreet steps, e.g. by shifting a multi-speed transmission driving the axle.

As further shown in FIG. 1, mower 4 includes an upwardly and rearwardly extending handle assembly 18. Handle assembly 18 includes a pair of parallel, laterally spaced, side tubes 20 connected at their lower ends to frame 6 of mower 4. Side tubes 20 are joined together at their upper ends by a substantially horizontal cross tube 22. When the traction drive is not powered, the operator would be able to manually maneuver frame 6 of mower 4 by gripping cross tube 22 and by using cross tube 22 to push forwardly or pull rearwardly on frame 6 of mower 4.

Handle assembly 18 includes a traction speed control that in one embodiment thereof comprises a laterally extending, pivotal hand grip 24 carried on the upper rear end of handle assembly 18 forward of and above cross tube 22 of handle assembly 18. During an actual grass cutting operation, the operator's hands will usually be gripping hand grip 24 rather than cross tube 22. Handle assembly 18 further includes an implement control that in one embodiment thereof disengages and engages the operation of the blade(s) of mower 4. As shown in FIG. 1, the implement control may comprise a laterally extending, pivotal bail 26 having a general size and shape that mimics that of hand grip 24. Bail 26 may be positioned forward of and slightly below hand grip 24. Other positions of bail 26 relative to hand grip 24 are possible.

The blade(s) of mower 4 are disengaged when bail 26 is spaced away from hand grip 24 as shown in FIG. 1. The blade(s) of mower 4 are engaged when the operator reaches out with the fingers of at least one hand and pivots bail 26 into a closed position closer to or against hand grip 24. This blade engagement continues for so long as the operator holds bail 26 in the closed position. Bail 26 will automatically return to its spaced position relative to hand grip 24 to disengage the blade(s) when the operator releases bail 26. If so desired, some type of bail latch (not shown) that must be released could be required in order for the operator to close bail 26 against hand grip 24 to mitigate the chance of the operator inadvertently starting the operation of the blade(s).

In some embodiments, this invention relates to the use of one or more compliant mechanisms to mount either or both of traction control hand grip 24 and implement control bail 26 on the top of handle assembly 18. In mechanical engineering, a compliant mechanism is commonly defined as a flexible mechanism that achieves force and motion transmission through elastic body deformation. It gains some or all of its motion from the relative flexibility of its members rather than from rigid-body joints alone. The term compliant mechanism shall be used herein in accordance with this definition.

Figure 2:
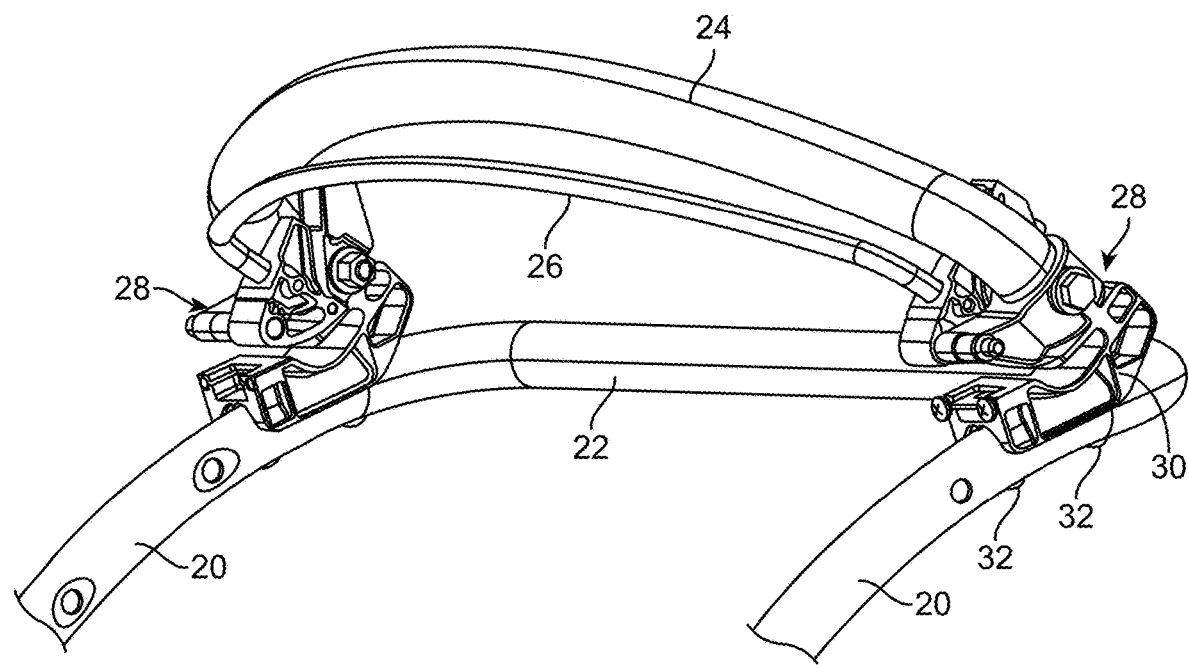
FIG. 2 is an enlarged perspective view of the operational controls of FIG. 1.
Figure 3:
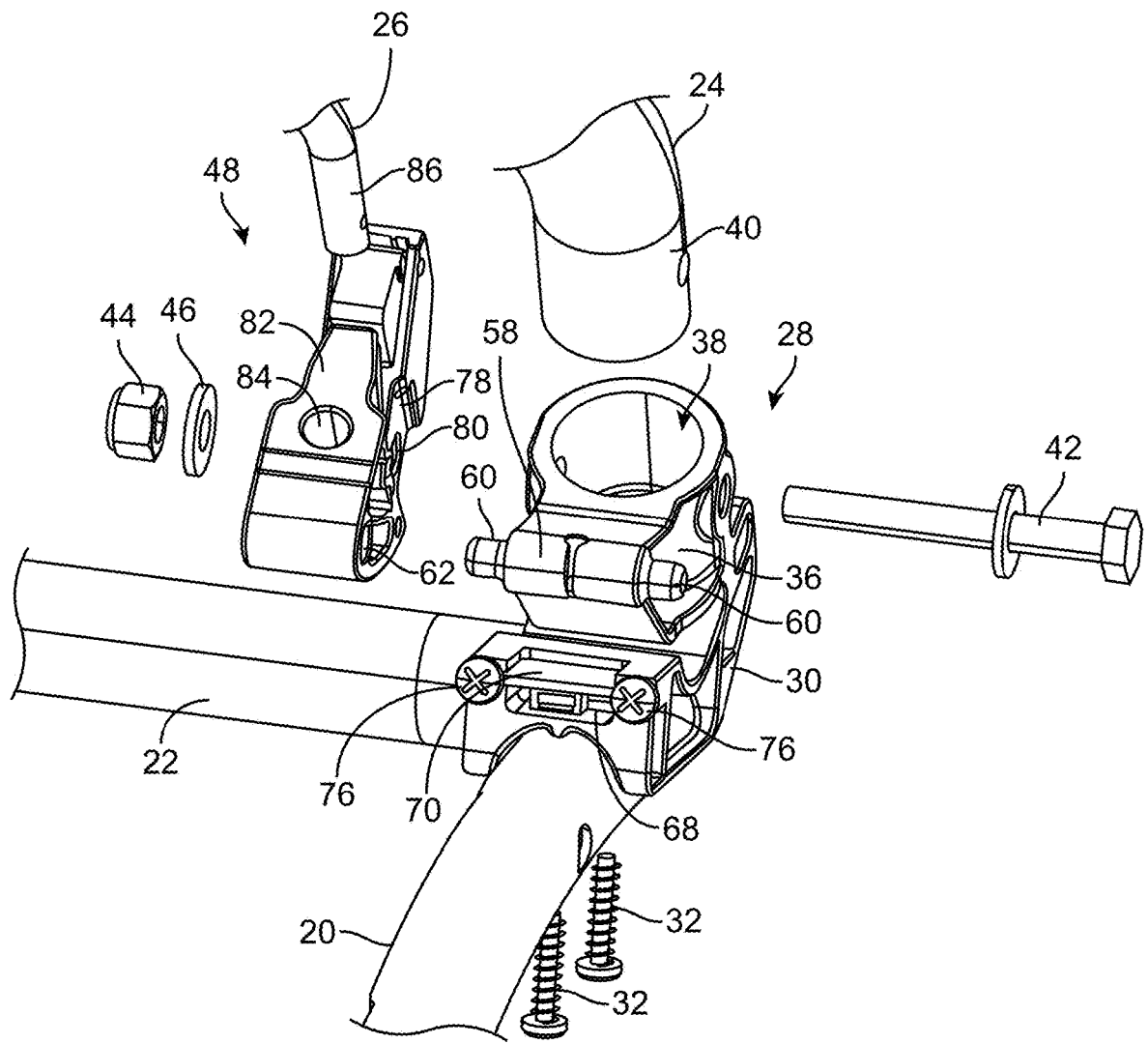
FIG. 3 is a partial perspective view of the operational controls of FIG. 1, the controls being shown in exploded form for the sake of clarity.
Figure 4:
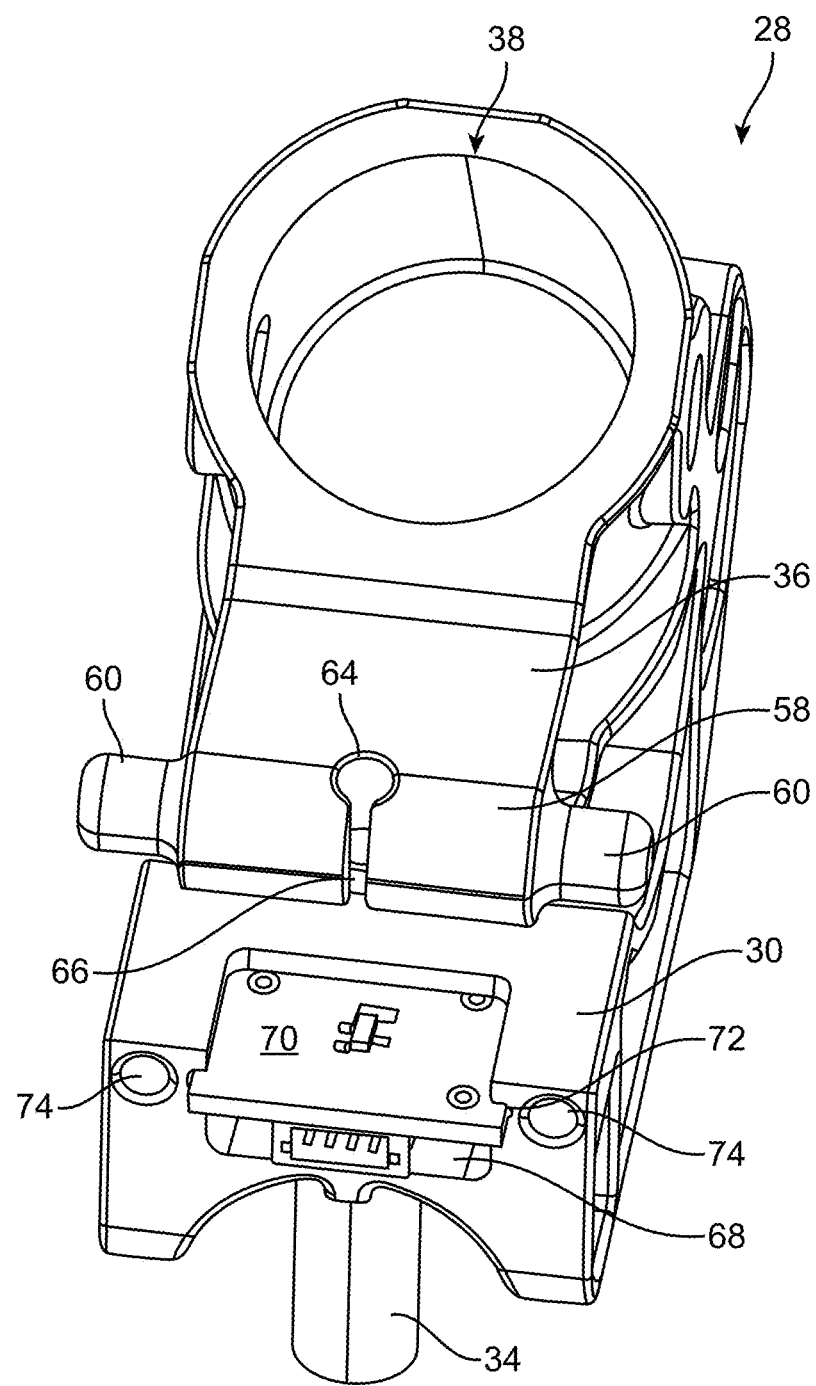
FIG. 4 is an enlarged perspective view of a first compliant mechanism used to mount one of the operational controls of FIG. 1, i.e., a traction control, to the handle of the walk outdoor power equipment unit, particularly illustrating a magnet and Hall sensor incorporated in the first compliant mechanism.
Figure 5:
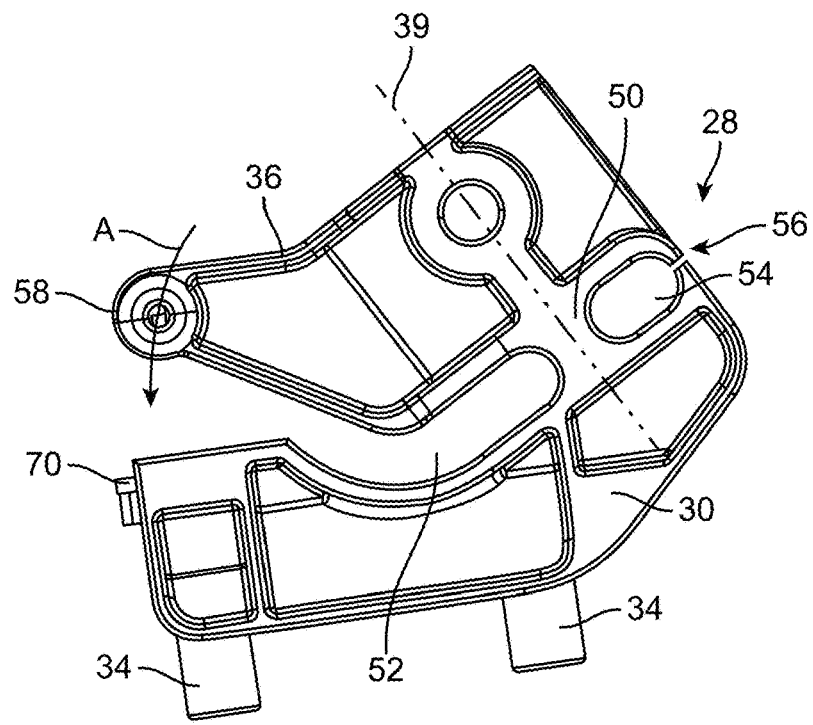
FIG. 5 is a side elevational view of the first compliant mechanism for pivotally mounting the traction control to the handle of the walk outdoor power equipment unit.

Referring now to FIGS. 2-6, a first compliant mechanism 28 is duplicated on each side of handle assembly 18 to affix the opposite ends of hand grip 24 to the upper ends of side tubes 20 of handle assembly 18. As best shown in FIGS. 2 and 3, first compliant mechanism 28 has a fixed body portion 30 substantially rigidly secured to the top of the upper end of side tube 20 by a plurality of threaded fasteners 32. Fasteners 32 extend upwardly through apertures in the bottom of side tube 20 and thread into internally threaded bores contained in posts 34, best seen in FIG. 5, provided on fixed body portion 30 of first compliant mechanism 28. When each first compliant mechanism 28 is being installed on its respective side tube 20, posts 34 are pushed into the interior of side tube 20 through apertures in the top of side tube 20 with the threaded bores of posts 34 aligning with the apertures in the bottom of side tube 20. When fasteners 32 are then pushed up through the apertures in the bottom of side tube 20 and are then tightened in the downwardly facing bores of posts 34, fixed body portion 30 of each first compliant mechanism 28 will be substantially rigidly mounted to its respective side tube 20.

First compliant mechanism 28 further includes a movable body portion 36 that is an integral part of first compliant mechanism 28 but is able to flex in a generally pivotal manner with respect to fixed body portion 30. Referring to FIG. 3, movable body portion 36 has an upwardly facing, generally cylindrical socket 38 that receives the downwardly facing, generally cylindrical end 40 of one side of hand grip 24. Once hand grip end 40 is inserted into socket 38, a laterally extending, horizontal bolt 42 passes through aligned apertures in hand grip end 40 and socket 38. When a nut 44 and washer 46 are tightened on the end of bolt 42, hand grip end 40 is substantially affixed to movable body portion 36 of first compliant mechanism 28.

In the embodiment shown in FIG. 3, bolt 42 does double duty as it extends beyond first compliant mechanism 28 to rigidly affix a portion of a second compliant mechanism 48 to the inner side of first compliant mechanism 28. Second compliant mechanism 48 movably mounts bail 26 adjacent hand grip 24 in a manner that will be described more fully hereafter. However, in embodiments of the invention in which the implement control formed by bail 26 is not used and there is no second compliant mechanism 48, bolt 42 shown in FIG. 3 will be shorter and the nut 44 and washer 46 will directly engage against the inner side of first compliant mechanism 28 rather than the inner side of second compliant mechanism 48.

Referring now to FIG. 5 hereof, the centerline 39 of socket 38 of movable body portion 36 of first compliant mechanism 28 is aligned with a narrow web 50 which connects the movable and fixed body portions 28, 48 of first compliant mechanism 28 together to unify them into a unitary structure. A first relatively long, open ended, front slot 52 is placed forward of web 50 and extends through the thickness of first compliant mechanism 28. A second relatively short, open ended, rear slot 54 is placed rearward of web 50 and also extends through the thickness of first compliant mechanism 28. Second slot 54 has an open end that comprises a relatively small slit 56 while the first slot has an open end that is much larger.

Referring to FIG. 3, movable body portion 36 of first compliant mechanism 28 has a front end 58. The opposite sides of front end 58 include two reduced diameter portions 60 that extend laterally outwardly from opposite sides of front end 58. Reduced diameter portion 60 on the inward side of front end 58 of movable body portion 36 of first compliant mechanism 28 will be received within a front circular opening 62 on second compliant mechanism 48. This helps locate second compliant mechanism 48 on first compliant mechanism 28.

As best shown in FIG. 4, front end 58 of movable body portion 36 of first compliant mechanism 28 has a vertical bore 64 extending downwardly from the top thereof. A small cylindrical magnet 66 can be inserted into and pushed downwardly into bore 64 until magnet 66 rests atop an inwardly extending ledge (not shown) within bore 64 as shown in FIG. 4. Magnet 66 can be retained in this position by a pair of flexible detents (not shown) on opposite sides of bore 64 which allow magnet 66 to pass as it is inserted through bore 64 but which then snap over on top of magnet 66 once magnet 66 has reached the ledge. Other ways of attaching magnet 66 to front end 58 of movable body portion 36 of first compliant mechanism 28 could be used.

Referring now to FIGS. 3 and 4, the top of a front end of fixed body portion 30 of first compliant mechanism 28 includes an upwardly open pocket 68. An electrically operated sensor, such as, but not limited to, a Hall sensor 70, is installed in a horizontal slideway 72 at the top of pocket 68 as best shown in FIG. 4. Two apertures 74 also shown in FIG. 4 are disposed respectively on either side of slideway 72. Once Hall sensor 70 is fully inserted in slideway 72, two screws 76 are threaded into apertures 74. When screws 76 are so installed, portions of the heads of screws 76 will abut against opposite sides of Hall sensor 70 to retain Hall sensor 70 in slideway 72 as best shown in FIG. 3.

FIG. 5 illustrates first compliant mechanism 28 in a neutral position in which it has not been deformed or flexed by force applied to hand grip 24. If the operator wishes to adjust the traction speed of mower 4 and is gripping hand grip 24, the operator need only push forwardly on hand grip 24. This will cause front end 58 of movable body portion 36 of first compliant mechanism 28 to flex or pivot generally downwardly towards fixed body portion 30 in the direction of arrow A in FIG. 5. This motion is permitted by front slot 52 in first compliant mechanism 28 which will narrow somewhat as hand grip 24 is pushed forwardly and by rear slot 54 which will expand somewhat as hand grip 24 is pushed forwardly.

Conversely, the operator cannot meaningfully move hand grip 24 in the opposite or rearward direction from neutral. This is prevented by the very narrow slit 56 that forms the opening on rear slot 54. Slit 56 will substantially immediately closed upon such rearward motion of hand grip 24. Thus, in a unidirectional variable speed traction drive embodiment of the invention under consideration here, movable body portion 36 of first compliant mechanism 28 becomes rigid almost immediately upon any motion of hand grip 24 in a rearward direction from neutral. In other bidirectional, variable speed traction embodiments, slit 56 that forms the open end of rear slot 54 could be much wider to allow movable body portion 36 of first compliant mechanism 28 to flex meaningfully rearwardly when hand grip 24 is moved rearwardly out of neutral.

Together, magnet 66 and Hall sensor 70 provide a motion sensing device that can infinitely determine the degree of motion of movable body portion 36 relative to fixed body portion 30. This motion is caused by the operator moving hand grip 24 forwardly to set or select a desired forward traction speed. The motion information provided by Hall sensor 70 is sent to an electronic controller on mower 4. The electronic controller then varies the operational speed of the traction drive in concert with how far hand grip 24 has been pivoted forwardly by the operator out of a neutral position thereof.

Figure 6:
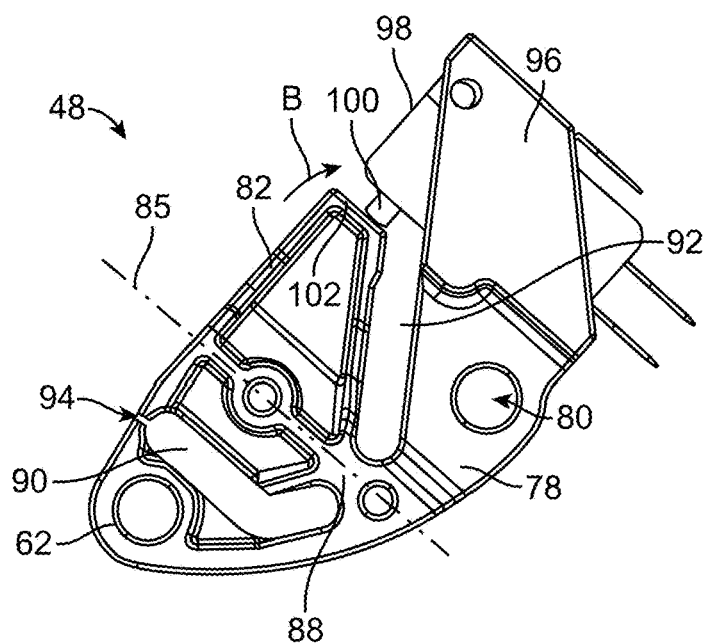
FIG. 6 is a side elevational view of a second compliant mechanism which pivotally mounts an implement control directly to a portion of the first compliant mechanism as a way of indirectly mounting the implement control to the handle of the walk outdoor power equipment unit.

Referring now to FIGS. 3 and 6, second compliant mechanism 48 has a fixed body portion 78 that includes a lateral passage 80 that receives bolt 42 that secures movable body portion 36 of first compliant mechanism 28 to hand grip 24. In addition, reduced diameter portion 60 of front end 58 of movable body portion 36 of first compliant mechanism 28 is inserted into circular opening 62 of fixed body portion 78 of second compliant mechanism 48. When nut 44 and washer 46 are tightened on bolt 42, fixed body portion 78 of second compliant mechanism 48 will be drawn towards and clamped tightly against the inner side of movable body portion 36 of first compliant mechanism 28 as best shown in FIG. 2. Thus, as movable body portion 36 of first compliant mechanism 28 flexes during motion of hand grip 24 to control the traction drive, second compliant mechanism 48 will move with movable body portion 36 of first compliant mechanism 28 with bail 26 maintaining a fixed orientation relative to hand grip 24.

Second compliant mechanism 48 has a movable body portion 82 which includes an upwardly facing, generally cylindrical socket 84 that receives the downwardly facing, generally cylindrical end 86 of one side of bail 26. Once bail end 86 is inserted into bail socket 84, a laterally extending fastener (not shown) passes through aligned apertures in bail end 86 and bail socket 84 to secure bail 26 to movable body portion 82 of second compliant mechanism 48. When the pair of second compliant mechanisms 48 are mounted on the pair of first compliant mechanism 28 and the opposite ends 86 of bail 26 are inserted into bail sockets 84 on the pair of laterally spaced second compliant mechanisms 48, bail 26 will be disposed in an implement disengaged position spaced away from hand grip 24 as best shown in FIG. 2.

Referring now to FIG. 6 hereof, the centerline 85 of bail socket 84 of movable body portion 82 of second compliant mechanism 48 is aligned with a narrow web 88 that connects the fixed and movable body portions 78, 82 of second compliant mechanism 48 together to unify them into a unitary structure. A first relatively long, open ended, front slot 90 is placed forward of web 88 and extends through the thickness 82 of second compliant mechanism 48. A second relatively long, open ended, rear slot 92 is placed rearward of web 88 and also extends through the thickness of first compliant mechanism 28. First slot 90 has an open end that comprises a relatively small slit 94 while second slot 92 has an open end that is much larger.

As further shown in FIG. 6, fixed body portion 78 of second compliant mechanism 48 includes an upwardly open switch housing 96 that receives the case of an on/off type electrical switch 98. Switch 98 has a plunger 100 that is outwardly biased by an internal spring within the case. Plunger 100 when fully extended from the case in the off position of switch 98 is in contact with or spaced close to a rear wall 102 of movable body portion 82 of second compliant mechanism 48. In order to change the state of switch 98 from off to on, the rear wall of movable body portion 82 of second compliant mechanism 48 must be moved rearwardly in FIG. 6 to depress plunger 100 relative to the case of switch 98 sufficiently to change the state of switch 98 to on. When switch 98 is placed into the on state, the controller of mower 4 will receive an activation signal and will engage the operation of the implement, e.g. start the blade(s) of mower 4 rotating when outdoor power equipment unit 2 comprises a mower 4 as shown in FIG. 1.

The motion of movable body portion 82 of second compliant mechanism 48 which is needed to actuate switch 98 is caused by the operator closing bail 26 from its usual position spaced away from hand grip 24 to an implement engaged position adjacent to or in contact with hand grip 24. The force applied by bail 26 to movable body portion 82 of second compliant mechanism 48 is sufficient to flex movable body portion 82 of second compliant mechanism 48 about web 88 relative to fixed body portion 78 of second compliant mechanism 48. This will cause rear wall 102 of movable body portion 82 of second compliant mechanism 48 to flex or pivot generally downwardly/rearwardly towards switch 98 in the direction of arrow B in FIG. 6. This motion is permitted by rear slot 92 in second compliant mechanism 48 which will narrow somewhat as bail 26 is pulled rearwardly and by front slot 90 which will expand somewhat as bail 26 is pulled rearwardly. The amount of motion allowed upon the closing of bail 26 will be sufficient to change the state of switch 98 from off to on to thereby start the operation of the implement.

One material which can be used to manufacture first compliant mechanism 28 and/or second compliant mechanism 48 or any other compliant mechanism described in this application is a thermoplastic polyester elastomer such as DuPont Hytrel 7246.

Each compliant mechanism 28, 48 could be used in an outdoor power equipment unit 2 without using the other. For example, in another embodiment of the invention depicted in FIGS. 7 and 8 hereof, first compliant mechanism 28 has been removed in favor of a first non-compliant mechanism 28' for mounting hand grip 24 to handle. Each first non-compliant mechanism 28' is duplicated on both side tubes 20 when hand grip 24 extends across the full width of handle 18. Since first non-compliant mechanism 28' is similar to first compliant mechanism 28, the reference numerals used to refer to the same components of first compliant mechanism 28 will be used to refer to the corresponding components of first non-compliant mechanism 28' with a single prime designation following the reference numeral.

Figure 8:
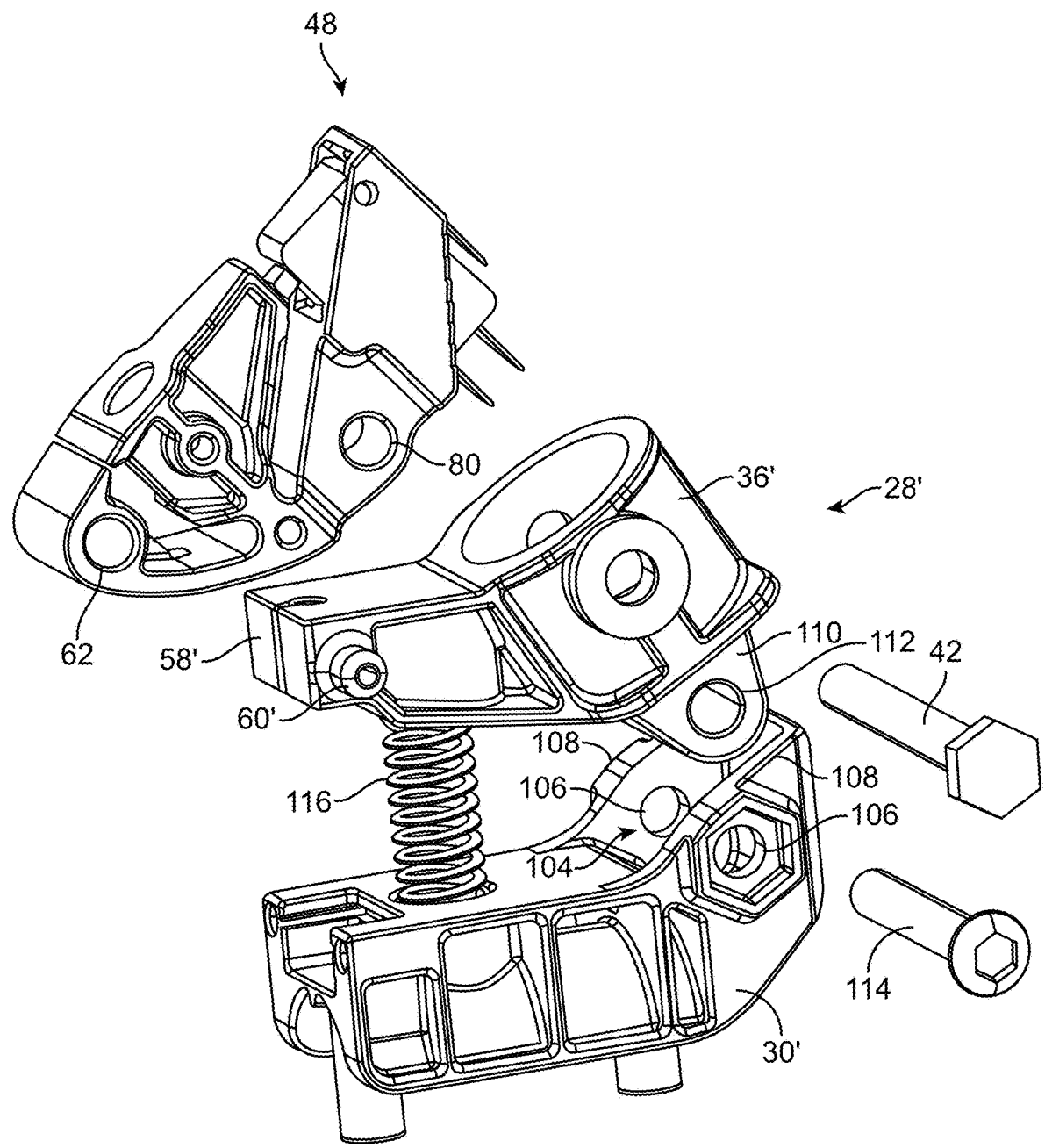
FIG. 8 is an exploded view of the second embodiment of the operational controls of FIG. 7, particularly illustrating the first non-complaint mechanism in an exploded form for the sake of clarity.

First non-compliant mechanism 28' bas a substantially rigid fixed body portion 30' and a substantially rigid movable body portion 36' having overall shapes and functions similar to their compliant counterparts 30, 36. As best shown in FIG. 8, fixed body portion 30' has a cavity 104 that includes aligned apertures 106 in spaced side walls 108 of cavity 104. A protrusion or plug 110 on an underside of a rear portion of movable body portion 36' fits down into cavity 104. Plug 110 has a through bore 112 that is aligned with apertures 106 in side walls 108 of cavity 104 when movable body portion 36' is assembled onto fixed body portion 30'. A rigid pivot pin 114 then passes through apertures 106 and bore 112. Pivot pin 114 can be secured by a bolt (not shown) on one end of pivot pin 114 to provide a mechanical pivot connection between fixed body portion 30' and movable body portion 36'.

Figure 7:
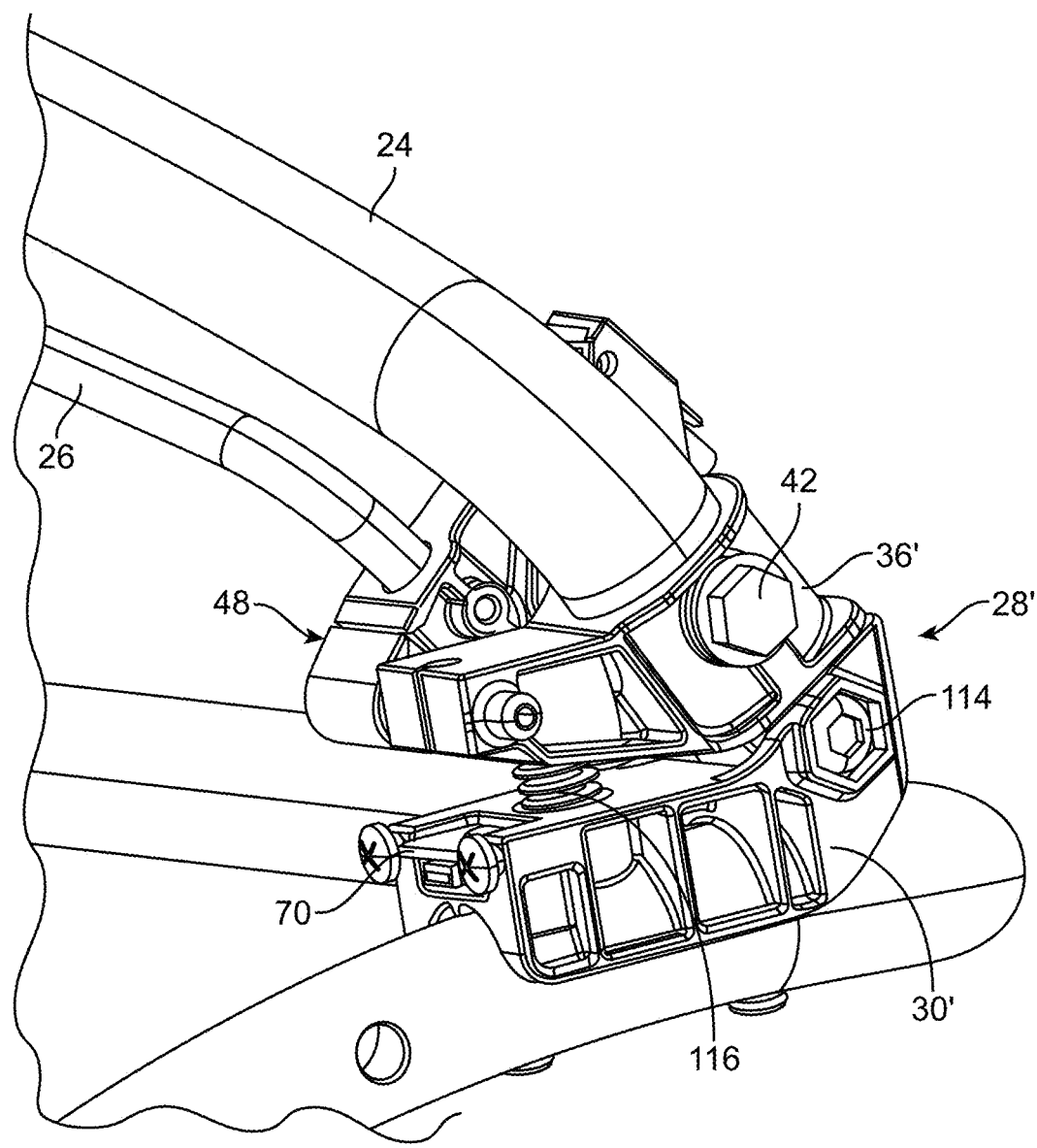
FIG. 7 is an enlarged perspective view of a second embodiment of the operational controls according to this invention, the first mechanism for mounting the traction control to the handle no longer comprising a compliant mechanism but now comprising a first non-compliant mechanism having a rigid pivot pin and for producing pivotal motion of the traction control and a mechanical spring for biasing the traction control towards neutral.

As shown in FIG. 7 and in addition to pivot pin 114, a mechanical compression spring 116 normally biases movable body portion 36' in a direction that places hand grip 24 in a neutral position in which the speed of the traction drive is zero. The neutral position could be established by a physical stop (not shown) between fixed body portion 30' and movable body portion 36' that limits further pivotal motion of hand grip 24 rearwardly.

When the operator pushes forwardly on hand grip 24 to control the speed of the traction drive, the movable body portion 36' will pivot downwardly about pivot pin 114 to compress spring 116 against fixed body portion 30'. Magnet 66 and Hall sensor 70 are present in this embodiment and will function as in the first embodiment of FIGS. 2-6 to control the traction speed depending upon the degree of downward pivoting of movable body portion 36' relative to fixed body portion 30'. When the operator releases hand grip 24, the compression built up in spring 116 will return hand grip 24 to its neutral position.

Second compliant mechanism 48 as disclosed in FIGS. 1-6 is still used in the embodiment of FIGS. 7 and 8 to support bail 26 for pivotal motion relative to hand grip 24.

Second compliant mechanism 48 is clamped against the side of movable body portion 36' of first non-compliant mechanism 28' by bolt 42 which passes through aperture 80 in second compliant mechanism 48. In addition, the opening 62 in the nose of second compliant mechanism 48 is still received on the reduced diameter portion 60' (hidden in FIG. 8) on the inward side of front end 58' of movable body portion 36' of first non-compliant mechanism 28'. This helps prevent any rotation of second compliant mechanism 48 relative to first non-compliant mechanism 28' about the axis of bolt 42. Second compliant mechanism 48 as used in the embodiment of FIGS. 7 and 8 works identically to its operation in the embodiment of FIGS. 1-6.

In a further variation, first compliant mechanism 28 could be used with second compliant mechanism 48 being removed and being replaced by a non-compliant mechanism which includes a rigid pivot and mechanical spring.

Figure 9:
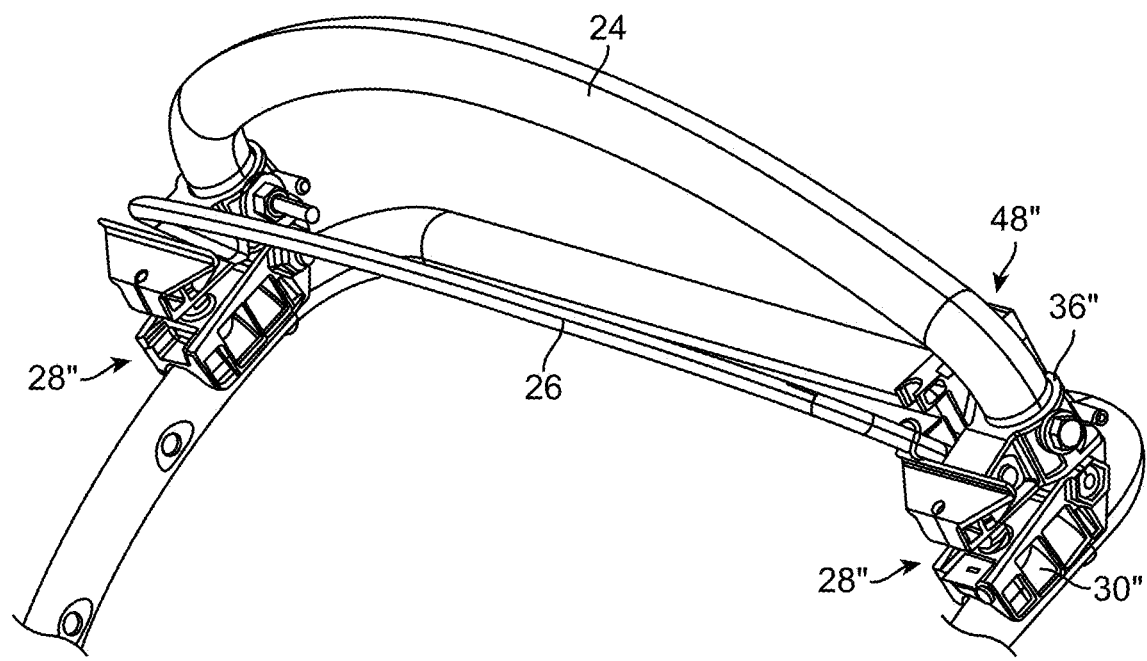
FIG. 9 is an enlarged perspective view of a third embodiment of the operational controls according to this invention, the first and second mechanisms for mounting the traction control and the implement control the handle no longer comprising compliant mechanisms but now comprising first and second non-compliant mechanisms each having a rigid pivot pin and a mechanical spring with the implement control acting through a compliant mechanism to engage and disengage the operation of the implement.
Figure 10:
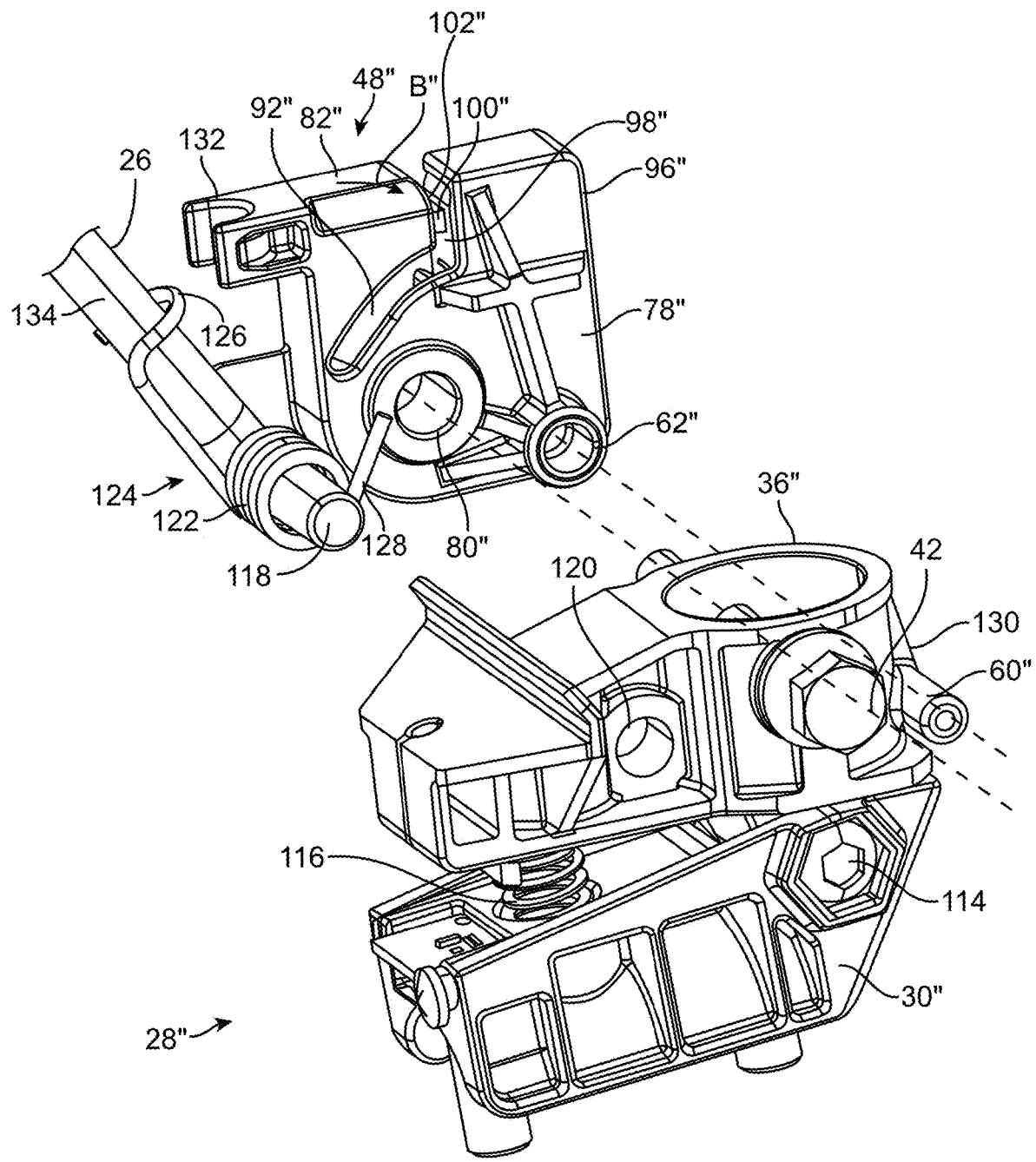
FIG. 10 is an exploded view of the third embodiment of the operational controls of FIG. 9, particularly illustrating the compliant mechanism and the first and second non-complaint mechanisms that pivotally mount the traction and implement controls to the handle.

Referring now to FIG. 9, an additional embodiment of this invention comprises a first non-compliant mechanism 28" which is duplicated and mounted on each side tube 20 of handle assembly 18. First non-compliant mechanism 28" of FIGS. 9 and 10 is a modified version of the first non-compliant mechanism 28' of FIGS. 7 and 8. Since first non-compliant mechanism 28" is similar to first non-compliant mechanism 28', the reference numerals used to refer to the same components of first compliant mechanism 28' will be used to refer to the corresponding components of first non-compliant mechanism 28" with a double prime designation following the reference numerals.

In this embodiment, there are no second compliant mechanisms 48 for providing pivotal motion of bail 26. Instead and referring to FIG. 10, the bottom of each side of bail 26 has an outwardly turned circular end that forms a rigid pivot pin 118. Each pivot pin 118 is rotatably received in a circular aperture of bushing 120 on movable body portion 36" of each first non-compliant mechanism 28". This pivotally journals the opposite ends of bail 26 directly on the pair of laterally spaced first non-compliant mechanisms 28", 28" mounted on side tubes 20, 20 of handle 18.

As further shown in FIG. 10, a coil 122 of a torsion spring 124 is concentrically installed around a pivot pin 118. One leg 126 of torsion spring 124 is hooked around a rear portion of one side of bail 26. The other leg 128 of torsion spring 124 will abut against a fixed portion of movable body portion 36" of the adjacent first non-compliant mechanism 28" to which the one side of bail 26 is journalled.

Normally, the bias of spring 124 will serve to move bail 26 to its neutral position spaced away from hand grip 24 as shown in FIG. 9. When bail 26 is pivoted to its closed position adjacent to or in contact with hand grip 24, torsion spring 124 will be wound up to store force therein. When the operator releases bail 26, this stored up force in torsion spring 124 will return bail 2 to its neutral position. Torsion spring 124 can be used on just one pivot pin 118 on one side of bail 26 or can be duplicated and used on both pivot pins 118 on both sides of bail 26.

In the embodiment of FIGS. 9 and 10, the second compliant mechanism 48 disclosed in FIGS. 1-8 is no longer needed to pivotally mount bail 26 in view of the mounting(s) provided by pivot pin 118 and spring 124. However, a modified second compliant mechanism 48" is still used with respect to the operation of bail 26. Since second compliant mechanism 48" is similar to second compliant mechanism 48 of FIGS. 1-8, the reference numerals used to refer to the same components of second compliant mechanism 48 will be used to refer to the corresponding components of second compliant mechanism 48" with a double prime designation following the reference numerals.

As shown in FIG. 9, second compliant mechanism 48" comprises a fixed body portion 78" that is clamped to the inward side of movable body portion 36" of first non-compliant mechanism 28". Referring to FIG. 10, this is accomplished by bolt 42 which passes through an aperture 80" in second compliant mechanism 48" to pull fixed body portion 78" of second complaint mechanism 48" tightly against first non-compliant mechanism 28" when a nut (not shown) on the free end of bolt 42 is tightened. In addition, the opposite sides of a rear end 130 of movable body portion 36" of first non-compliant mechanism 28" include two reduced diameter portions 60" that extend laterally outwardly from opposite sides of rear end 130. The reduced diameter portion 60" on the inward side of rear end 130 (not visible in FIG. 10) will be received within a rear circular opening 62" on second compliant mechanism 48". The engagement of reduced diameter portion 60" in opening 62" helps prevent any rotation of second compliant mechanism 48" relative to first non-compliant mechanism 28" about the axis of bolt 42.

Fixed body portion 78" of second compliant mechanism 48" still includes a switch housing 96" that receives the case of an on/off type electrical switch 98". Switch 98" has a plunger 100" that is outwardly biased by an internal spring within the case. Second compliant mechanism 48" has a movable body portion 82" that can flex relative to fixed body portion 78" by virtue of an elongated slot 92" that permits such flexure. A rear wall 102" of movable body portion 82" is slightly spaced from or in slight contact with plunger 100" of switch 98". Second compliant mechanism 48" is used on only one side of bail 26 as it not needed on the other side of bail 26.

As shown in FIGS. 9 and 10, when bail 26 is in its neutral or implement disengaged condition, bail 26 is spaced forwardly of movable body portion 82" of second compliant mechanism 48". The upper portion of movable body portion 82" includes a forwardly facing U-shaped cradle 132 which is shaped to receive a rearward portion of one leg 134 of bail 26. When the operator pivots bail 26 from its neutral position towards hand grip 24, the first lost motion portion of its travel takes up the space between bail 26 and cradle 132. Once bail leg 134 seats itself within cradle 132, further motion of bail 26 towards hand grip 24 causes movable body portion 82" of second compliant mechanism 48" to flex or pivot generally downwardly/rearwardly towards switch 98 in the direction of arrow B" in FIG. 10. The amount of such flexure is sufficient to depress plunger 100" and thereby actuate switch 98" to begin the operation of the powered implement, e.g. the blades of mower 4.

The use of either or both of the first and second compliant mechanisms 28, 48 to mount traction drive and implement controls on the handle of a walk outdoor power equipment unit 2 is an advance in the art. It avoids the cost of using numerous rigid pivots and mechanical springs in the limited spaces available for the controls at the top of handle assembly 18. In addition, while the embodiment of FIGS. 9 and 10 use rigid pivots and mechanical springs to mount the traction drive and implement controls, it still retains the use of a compliant mechanism 48" arranged in a lost motion manner relative to bail 26 to operate switch 98". This allows bail 26 to have a larger throw or arc of movement relative to hand grip 24, i.e. bail 26 when its neutral position is spaced further away from hand grip 24, as shown by comparing the positons of bail 26 relative to hand grip 24 as shown in FIGS. 2 and 9.

Various modifications of this invention will be apparent to those skilled in the art. For example, the use of a hand grip 24 and bail 26 that span the full width of handle assembly 18 and which are mounted by duplicate first and second compliant mechanisms to side tubes 20 is only one preferred embodiment of such controls. Hand grip 24 and bail 26 could be mounted only to one side tube 20 and extend only partially across the width of handle assembly 18.

Various other modifications will be apparent to those skilled in the art. Accordingly, the scope of this invention is to be limited only by the appended claims.

The invention claimed is:

1. A power equipment unit comprising:
a frame movable over a ground surface;
one or more prime movers carried by the frame;
a handle assembly carried by the frame and configured for use by an operator;
a traction drive carried by the frame and operatively powered by one of the one or more prime movers for self-propelling the frame over the ground surface at a variable ground speed;
an implement carried by the frame and operatively powered by one of the one or more prime movers for performing a ground grooming or working operation;
a compliant mechanism comprising:
a fixed body portion operatively coupled to the handle assembly; and
a movable body portion coupled to the fixed body portion; and
a traction control and an implement control connected to the movable body portion, wherein each of the traction control and the implement control are movable relative to the handle assembly by flexure provided by the compliant mechanism.

2. The power equipment unit of claim 1, wherein the compliant mechanism comprises:
a first compliant mechanism carrying the traction control; and
a second compliant mechanism carrying the implement control.

3. The power equipment unit of claim 2, wherein the first compliant mechanism comprises: a fixed body portion secured to the handle assembly; a movable body portion; and a web integrally connecting the fixed body portion to the movable body portion.

4. The power equipment unit of claim 3, wherein the second compliant mechanism is mounted to the first compliant mechanism.

5. The power equipment unit of claim 3, wherein the second compliant mechanism comprises: a fixed body portion secured to the movable body portion of the first compliant mechanism; a movable body portion; and a web integrally connecting the fixed body portion of the second compliant mechanism to the movable body portion of the second compliant mechanism.

6. The power equipment unit of claim 1, wherein the traction control comprises a hand grip.

7. The power equipment unit of claim 1, wherein the implement control comprises a bail.

8. The power equipment unit of claim 1, wherein the compliant mechanism comprises a thermoplastic polyester elastomer.

9. The power equipment unit of claim 1, wherein the handle assembly comprises a first side tube and a second side tube, and wherein the compliant mechanism includes a first compliant mechanism coupled to the handle assembly at or near the first side tube, and a second compliant mechanism coupled to the handle assembly at or near the second side tube.

10. The power equipment unit of claim 1, further comprising a magnet secured to one of the movable body portion and the fixed body portion of the compliant mechanism, and a Hall sensor secured to the other of the movable body portion and the fixed body portion of the compliant mechanism, wherein the Hall sensor is configured to detect movement of the magnet during movement of the movable body portion relative to the fixed body portion.

11. The power equipment unit of claim 1, further comprising a non-compliant mechanism comprising:
a fixed body portion secured to the handle assembly; and
a movable body portion pivotally connected to the fixed body portion, wherein the fixed body portion of the compliant mechanism is connected to the movable body portion of the non-compliant mechanism, and the movable body portion of the compliant mechanism is connected to the fixed body portion of the compliant mechanism by a flexure.

12. The power equipment unit of claim 11, further comprising a switch secured to the fixed body portion of the compliant mechanism, the switch comprising a plunger selectively actuated by the movable body portion of the compliant mechanism.

13. A power equipment unit for performing a ground grooming or working operation, the unit comprising:
a frame movable over a ground surface;
one or more prime movers carried by the frame;
a traction drive carried by the frame and operatively powered by one of the one or more prime movers for self-propelling the frame over the ground surface at a variable ground speed;
an implement carried by the frame and operatively powered by one of the one or more prime movers for performing the ground grooming or working operation;
a handle assembly carried by the frame;
a traction drive control operatively coupled to the handle assembly by a traction drive control mechanism, wherein the traction drive control mechanism comprises: a fixed body portion secured to the handle assembly; and a movable body portion movable relative to the fixed body portion to support the traction drive control; and
an implement control operatively coupled to the handle assembly by an implement control mechanism, wherein the implement control mechanism comprises: a fixed body portion secured to the movable body portion of the traction drive control mechanism; and a movable body portion movable relative to the fixed body portion of the implement control mechanism to support the implement control.

14. The power equipment unit of claim 13, wherein the fixed body portion of the traction drive control mechanism is connected to the movable body portion of the traction drive control mechanism by a flexure.

15. The power equipment unit of claim 13, wherein the fixed body portion of the implement control mechanism is connected to the movable body portion of the traction drive control mechanism, and wherein the fixed body portion of the implement control mechanism is connected to the movable body portion of the implement control mechanism by a flexure.

* * * * *